United States Patent
Ohno

[19]

[11] Patent Number: 6,011,928
[45] Date of Patent: Jan. 4, 2000

[54] FINDER WITH FOCUSING INDICATOR

[75] Inventor: Kazunori Ohno, Omiya, Japan

[73] Assignee: Fuji Photo Optical Co., Ltd., Saitama, Japan

[21] Appl. No.: 08/988,381

[22] Filed: Dec. 10, 1997

[30] Foreign Application Priority Data

Jan. 7, 1997 [JP] Japan ..................................... 9-013088

[51] Int. Cl.[7] .................................................. G03B 17/20
[52] U.S. Cl. ............................................ 396/147; 396/148
[58] Field of Search .................................... 396/147, 148, 396/296, 295, 290

[56] References Cited

U.S. PATENT DOCUMENTS 3,675,558  7/1972  Kuramoto et al. ....................... 396/296
4,011,571  3/1977  Okuzawa ................................. 396/296

*Primary Examiner*—W. B. Perkey
*Attorney, Agent, or Firm*—Snider & Associates; Ronald R. Snider

[57] ABSTRACT

A plurality of indexes which become references for focusing are successively displayed on a finder in synchronization with an focusing operation of a focus lens, and focusing is performed while the size of the displayed index and the size of the object image are compared with each other, thus simplifying a configuration for focusing. A focusing ring 5 is inscribed with indexes 4a to 4d having sizes substantially corresponding to sizes of an object image at various focal lengths, respectively. Images of the indexes 4a to 4d are displayed in a finder 3 by a deflecting prism 9 attached to an objective lens 7 of the finder 3. A photographer rotates the focusing ring 5 and compares the sizes of the indexes 4a to 4d with the size of the object image observed through the finder 3, and the focusing operation is completed at the time when one of the indexes 4a to 4d that has a size closest to the object image is displayed.

26 Claims, 7 Drawing Sheets

F I G.7
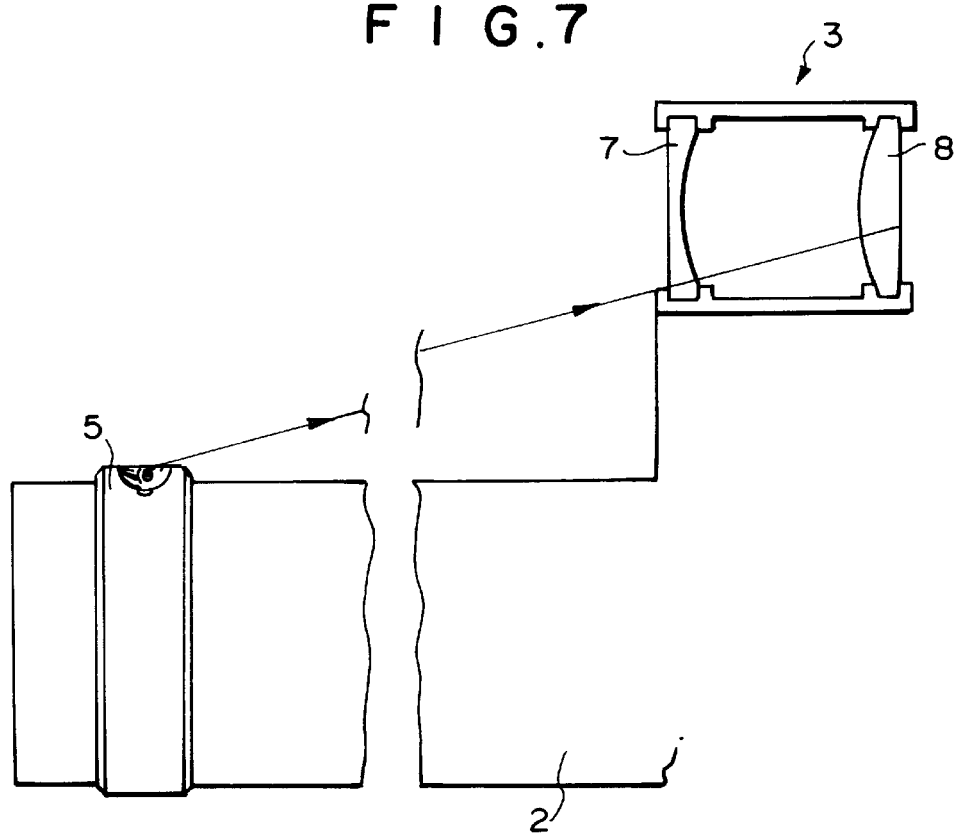
F I G.8
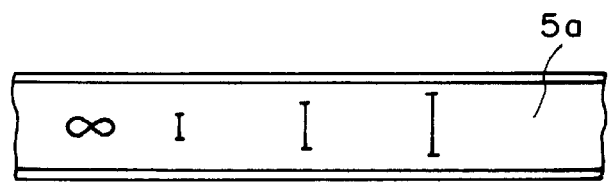

FINDER WITH FOCUSING INDICATOR

RELATED APPLICATIONS

This application claims the priority of Japanese Patent Application No. 9-13088 filed on Jan. 7, 1997, which is incorporated herein by reference.

BACKGROUND OF THE INVENTION

1. Field of the Invention

The present invention relates to a finder equipped with a focusing indicator and, in particular, to a finder equipped with a focusing indicator having, for example, an index based on an average size of human faces, in which focusing is easily performed by matching the apparent size of an object, which changes depending on the object position, with this index.

2. Description of the Prior Art

Known as conventional finders having a range finder are not only those having an authentic trigonometric range finder equipped with a focusing window, but also a finder with a focusing indicator in which, while an index having an apparent size of an object image corresponding to a focal length is displayed within the finder, the apparent size of the index is changed according to the object distance, and the taking lens is moved along the optical axis in response to the change in size of the index. In such finder with a focusing indicator, the distance to the object can easily be measured by matching the apparent size of the object image, which alters as the object position changes, with the size of the index.

In such finder in which the size of the indicator changes, however, it is necessary to install a lens for changing the apparent size of the index or a mechanism for moving the index within the finder, and a mechanism for interlocking the movement of the index or lens with the movement of the taking lens is further necessary, thus complicating the focusing mechanism. Consequently, it may become problematic in terms of space and cost.

Recently, on the other hand, as films attain a higher sensitivity and cameras have a smaller size, the brightness of taking lenses has become darker, and as the lenses have a shorter focal length, the depth of field has become greater, thus allowing camera systems to be constructed with a range finder precision which is not so strict.

SUMMARY OF THE INVENTION

In view of these circumstances, it is an object of the present invention to provide a finder with focusing indicator which, while simplifying the configuration of the finder, can reduce its cost by omitting a mainstream auto-focusing mechanism and easily effect ranging.

The present invention provides a finder with focusing indicator comprising:

a finder;

at least one index having a size corresponding to a size of a predetermined object image observed through the finder according to a position where the object is disposed; and display means for successively displaying the index in synchronization with a focusing operation of a focus lens;

wherein focusing onto the object image is effected according to an operation performed in response to a result of comparison between the size of the index displayed on the finder by the display means and the size of the object image.

Also, the present invention provides a finder with focusing indicator comprising:

a finder;

at least two indexes each having a size corresponding to a size of a predetermined object image observed through the finder according to a position where the object is disposed; and display means for successively displaying the indexes in synchronization with a focusing operation of a focus lens;

wherein focusing onto the object image is effected according to an operation for selecting, of the indexes displayed on the finder by the display means, one that has a size closest to the size of the object image.

Preferably, each index is attached to a focusing ring which moves the focus lens along an optical axis, while the display means includes a part of an objective lens of the finder.

Preferably, each index is attached to a focusing ring which moves the focus lens along an optical axis, while the display means includes a deflecting prism, disposed near the objective lens, for guiding an image of the index to an eyepiece of the finder.

Preferably, each index is attached to a focusing ring which moves the focus lens along an optical axis, while the display means includes a dioptric-correction lens, disposed near the objective lens, for guiding an image of the index to the eyepiece of the finder.

Preferably, the deflecting prism or dioptric-correction lens is integrally molded with the objective lens.

BRIEF DESCRIPTION OF THE DRAWINGS

FIG. 7 is a view showing a state where an index is observed through the finder when a long lens barrel is used;

FIG. 8 is a view showing another example of indexes;

DESCRIPTION OF THE PREFERRED EMBODIMENTS

In the following, embodiments of the present invention will be explained with reference to the accompanying drawings.

Figure 1:
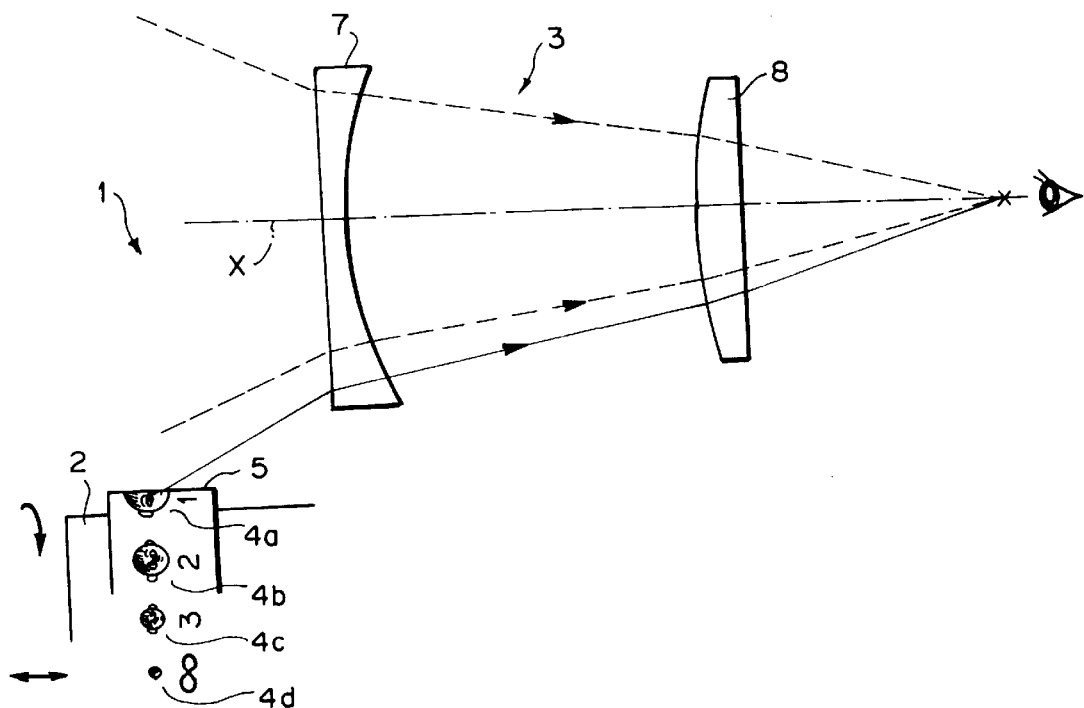
FIG. 1 is a partially sectional side view showing a configuration of a finder with focusing indicator in accordance with a first embodiment of the present invention.
Figure 2:
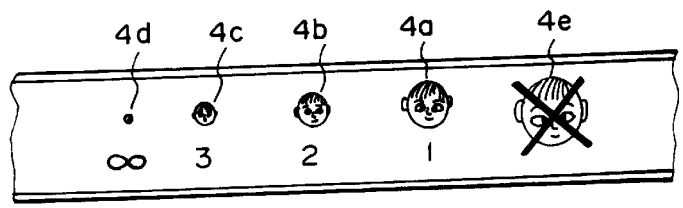
FIG. 2 is a view showing indexes inscribed in a focusing ring.

FIG. 1 is a partially sectional side view showing a configuration of a camera to which a first embodiment of the finder with focusing indicator in accordance with the present invention is applied. As shown in FIG. 1, this camera comprises a main body 1, a lens barrel 2 provided with a taking lens (not depicted), and a finder 3 constituted by an objective lens 7 and an eyepiece 8. To the lens barrel 2, a focusing ring 5 is attached so as to be rotatable around the optical axis. As shown in FIG. 2, the focusing ring 5 is inscribed with indexes 4a to 4d each having a size corresponding to a size of the face of a human image observed through the finder 3.

The indexes 4a to 4d have sizes substantially corresponding to the sizes of the face of the human image observed through the finder 3 at focal lengths of 1 m, 2 m, 3 m, and infinity, respectively. The taking lens is movable along the optical axis by moving means such as a cylindrical cam in order to perform focusing, and is moved as the focusing ring 5 is rotated around the optical axis.

In the following, operations of this embodiment will be explained.

Figure 3:
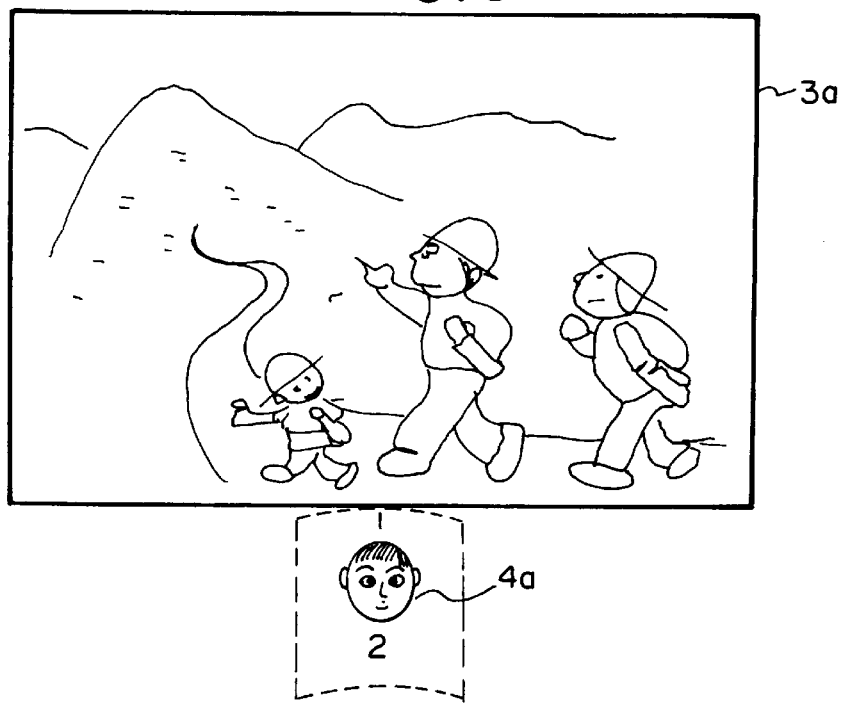
FIG. 3 is a view showing an image observed through the finder.

FIG. 3 shows an image including the face of a person (hereinafter referred to as human image 3a) observed through the finder 3. Here, as shown in FIG. 3, the images of the indexes 4a to 4d are refracted by the objective lens 7 and guided to the eyepiece 8. Accordingly, the human image 3a and the indexes 4a to 4d can be observed through the finder 3. Then, as the focusing ring 5 is rotated, one of the indexes 4a to 4d (index 4a in FIG. 3) that has a size closest to the size of the human image 3a being observed through the finder 3 is selected and displayed on the finder 3. As shown in FIG. 3, at the time when the index 4a having a size closest to the size of the human image 3a is displayed on the finder 3, the taking lens is in a state focused on the person. Then, the focusing operation is completed in this state.

Thus, in this embodiment, since the indexes 4a to 4d inscribed in the focusing ring 5 are successively displayed on the finder 3, and one of the indexes 4a to 4d that has a size closest to the size of the human image 3a observed through the finder 3 is selected to perform focusing, the focusing operation can be performed while the configuration of the finder 3 is simplified. Also, since no special means is necessary for displaying the indexes 4a to 4d, the camera can be constructed at a low cost.

In the following, a second embodiment of the present invention will be explained.

Figure 4:
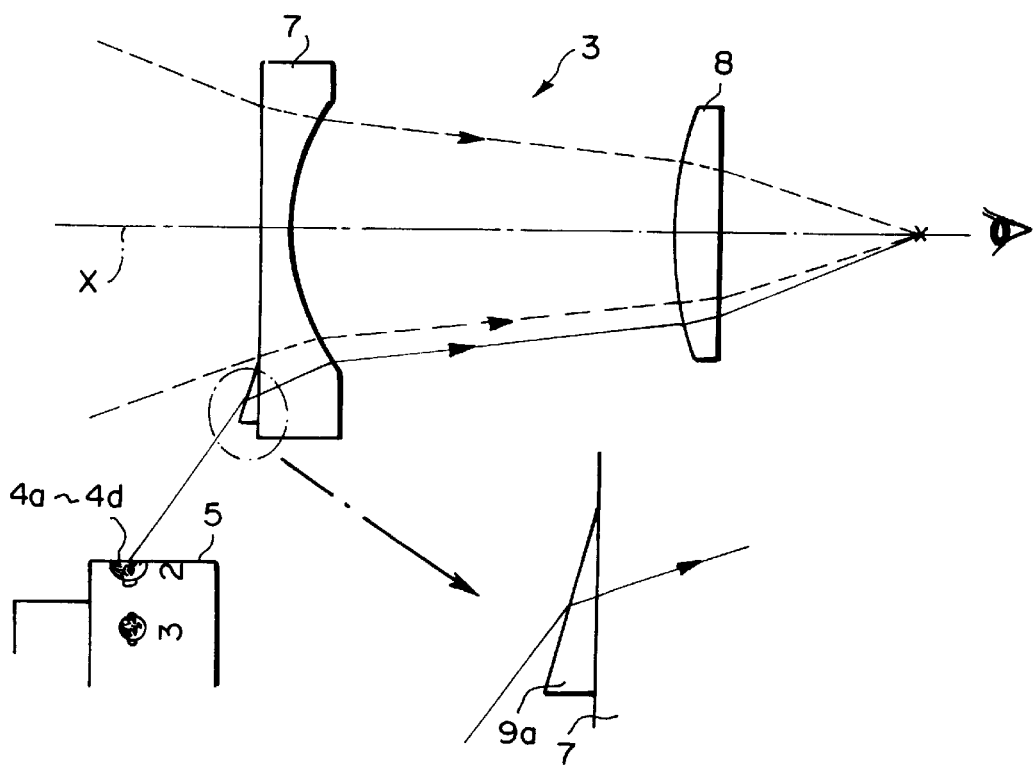
FIG. 4 is a partially sectional side view showing a configuration of a finder with focusing indicator in accordance with a second embodiment of the present invention.

FIG. 4 is a partially sectional side view showing a configuration of a camera to which the second embodiment of the finder with focusing indicator in accordance with the present invention is applied. The second embodiment differs from the first embodiment in that the lower part of the objective lens 7 is integrally molded with a deflecting prism 9a.

In the following, operations of this embodiment will be explained.

When a human image is being photographed, while the human image 3a is guided to the eyepiece 8 as with the first embodiment, the images of the indexes 4a to 4d are refracted by the deflecting prism 9a so as to be guided to the eyepiece 8 as shown in FIG. 4. Accordingly, as with the first embodiment, the human image 3a and the indexes 4a to 4d can be observed through the finder 3. Then, as the focusing ring 5 is rotated, one of the indexes 4a to 4d that has a size closest to the size of the human image 3a being observed through the finder 3 is selected and displayed on the finder 3. At the time when the one of the indexes 4a to 4d having a size closest to the size of the human image 3a is displayed on the finder 3, the taking lens is in a state focused on the person. Then, the focusing operation is completed in this state.

Thus, in this embodiment, since the indexes 4a to 4d inscribed in the focusing ring 5 are successively displayed on the finder 3, and one of the indexes 4a to 4d that has a size closest to the size of the human image 3a observed through the finder 3 is selected to perform focusing, the focusing operation can be performed while the configuration of the finder 3 is simplified. Also, since only the deflecting prism 9a is necessary for displaying the indexes 4a to 4d, the camera can be constructed at a low cost.

Figure 5:
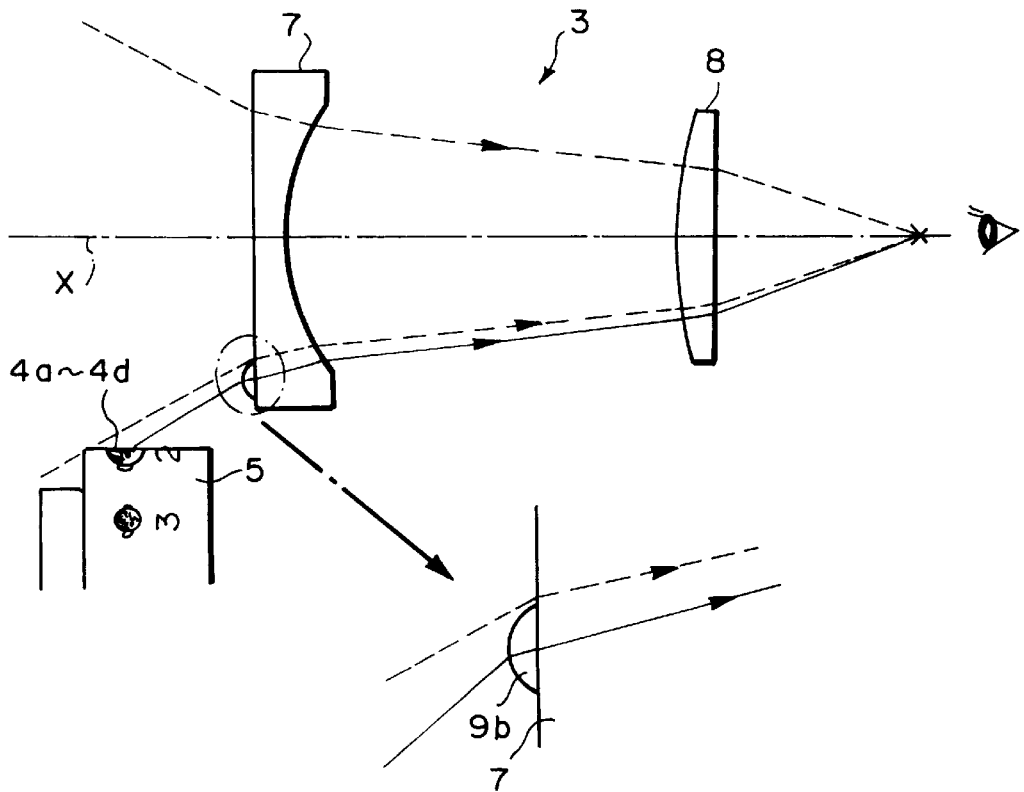
FIG. 5 is a view showing a state where an image of an index is displayed on the finder through a dioptric-correction lens.

Though the objective lens 7 of the finder 3 is provided with the deflecting prism 9a in the configuration mentioned above, a dioptric-correction lens 9b may be provided in place of the deflecting prism as shown in FIG. 5. When the dioptric-correction lens 9b is thus provided, the images of the indexes 4a to 4d are guided to the eyepiece 8 of the finder 3 as shown in FIG. 5 so as to be easily observed by a photographer. Then, the focusing operation can be performed similarly to the second embodiment.

While the objective lens 7 is integrally molded with the deflecting prism 9a or dioptric-correction lens 9b in the second embodiment, the objective lens 7 and the deflecting prism 9a or dioptric-correction lens 9b may be molded separately, and then the deflecting prism 9a or dioptric-correction lens 9b may be attached to the objective lens 7. Alternatively, the deflecting prism 9a or dioptric-correction lens 9b may be disposed close to but not in contact with the objective lens 7.

Though the focusing operation by the focusing ring 5 and displaying the indexes 4a to 4d are interlocked with each other in the first and second embodiments, the indexes 4a to 4d may be inscribed in a ring other than the focusing ring 5 so that one of the indexes 4a to 4d that has a size closest to the size of the human image 3a observed through the finder 3 can be selected, thus allowing only the focusing information based on the size of the selected index to be obtained. When focusing information is thus obtained, the focusing ring 5 can be rotated on the basis of this focusing information so as to perform a focusing operation with respect to the human image 3a to be photographed.

In the following, a third embodiment of the present invention will be explained.

Figure 6:
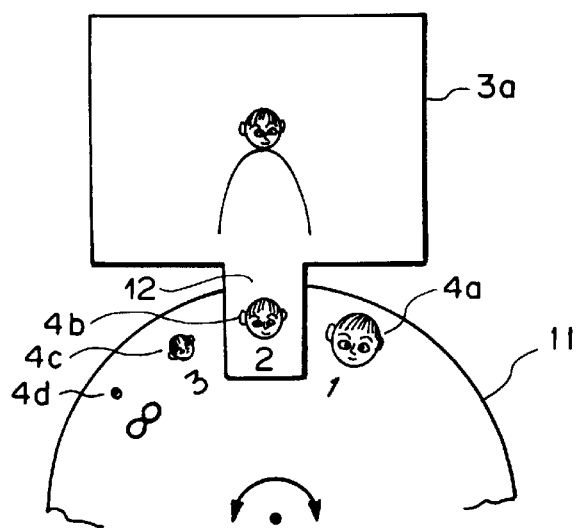
FIG. 6 is a view showing a configuration of a finder with focusing indicator in accordance with a third embodiment of the present invention.

FIG. 6 is a view showing a configuration of the finder with focusing indicator in accordance with the third embodiment of the present invention. As shown in FIG. 6, the finder 3 with focusing indicator in accordance with the third embodiment of the present invention comprises an index plate 11 inscribed with the indexes 4a to 4d, and the index plate 11 is made rotatable around the optical axis together with the focusing ring 5 (not depicted in FIG. 6), while a display window 12 for displaying the indexes 4a to 4d is disposed at the lower end of the finder 3. As with the first embodiment, the indexes 4a to 4d have sizes substantially corresponding to the sizes of the face of the human image observed through the finder 3 at focal lengths of 1 m, 2 m, 3 m, and infinity, respectively.

In the following, operations of the third embodiment will be explained.

FIG. 6 shows an image observed through the finder 3 when a human image is being photographed. As shown in FIG. 6, the human image 3a can be observed through the finder 3, while the images of the indexes 4a to 4d can be observed at the display window 12. Then, as the focusing ring 5 is rotated, one of the indexes 4a to 4d (index 4b in FIG. 6) that has a size closest to the size of the human image 3a being observed through the finder 3 is selected and displayed on the display window 12. At the time when the index 4b having a size closest to the size of the human image 3a is displayed on the display window 12, the taking lens has been moved to a position focused on the person. Then, the focusing operation is completed in this state.

Thus, in this embodiment, since the indexes 4a to 4d inscribed in the index plate 11 are successively displayed on the display window 12 attached to the finder 3, and one of the indexes 4a to 4d that has a size closest to the size of the human image 3a observed through the finder 3 is selected to perform focusing, the focusing operation can be performed while the configuration of the finder 3 is simplified, whereby the camera can be constructed at a low cost.

Though the indexes 4a to 4d are displayed in the finder 3 though the eyepiece 8 in the first embodiment, through the deflecting prism 9a or dioptric-correction lens 9b in the second embodiment, and through the index plate 11 and display window 12 in the third embodiment; the indexes 4a to 4d can be directly observed through the finder 3 when the lens barrel 2 of the camera is long, as in the case of a telephoto lens, as shown in FIG. 7. In this case, since the indexes 4a to 4d can be observed within the finder 3 without necessitating any specific means, the configuration of the camera can further be simplified.

While the focusing operation by the focusing ring 5 and displaying the indexes 4a to 4d by the index plate 11 are interlocked with each other in the third embodiment, the index plate 11 may be made rotatable independently of the focusing ring 5, so that only the focusing information based on one of the indexes 4a to 4d that has a size closest to the size of the human image 3a being observed at the display window 12 can be obtained. When focusing information is thus obtained, the focusing ring 5 can be rotated on the basis of this focusing information so as to perform a focusing operation with respect to the human image 3a to be photographed.

Though the indexes 4a to 4d simulate the face of a human image in the first to third embodiments; without being restricted thereto, various kinds of indexes, such as those shown in FIG. 8 that are constituted by gauges alone, may be used as well.

While focusing is performed at four points of 1 m, 2 m, 3 m, and infinity in the first to third embodiments, the present invention is also applicable to a camera which performs focusing at various positions such as three points of 1.5 m, 3 m, and infinity. In this case, indexes respectively corresponding to sizes of a human image at focal positions of 1.5 m and 3 m may be inscribed in the focusing ring 5 or the index plate 11.

In the following, a fourth embodiment of the present invention will be explained.

Figure 9:
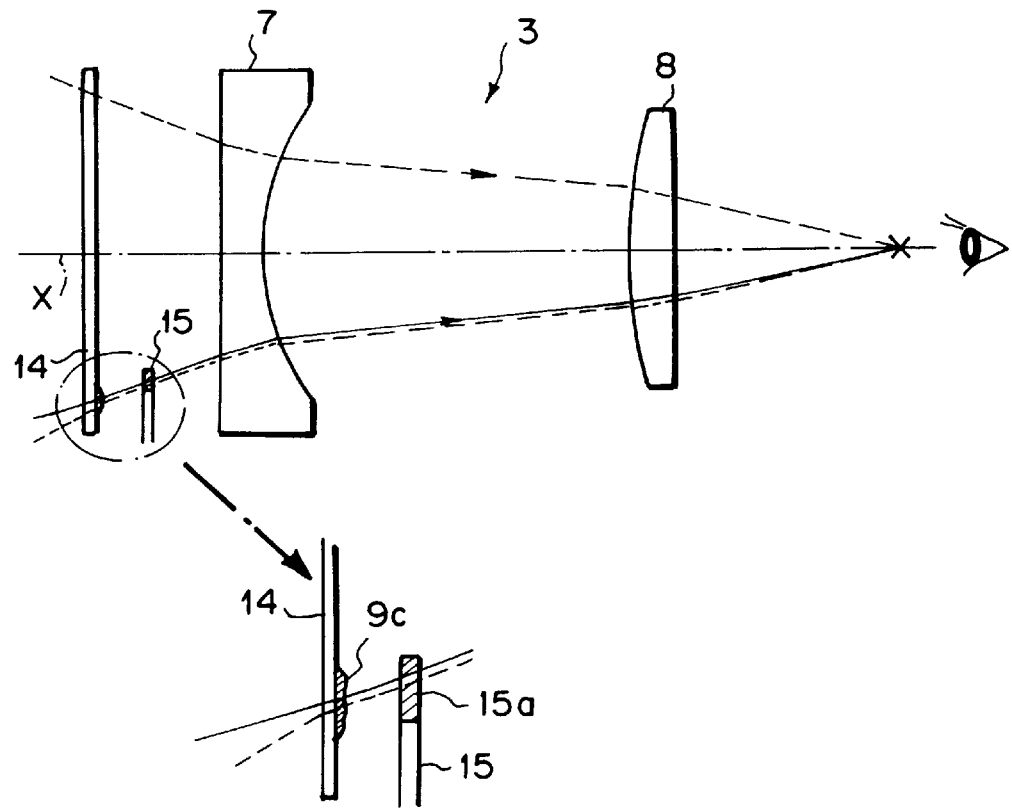
FIG. 9 is a sectional view showing a configuration of a finder with focusing indicator in accordance with a fourth embodiment of the present invention.

FIG. 9 is a view showing a configuration of the finder with focusing indicator in accordance with the fourth embodiment of the present invention. As shown in FIG. 9, the finder 3 with focusing indicator in accordance with the fourth embodiment of the present invention includes a transparent plate 14 disposed in front of the objective lens 7; a lens portion 9c disposed at a lower part of the transparent plate 14 and printed with the four indexes 4a to 4d in a row; and a pointer 15, having a colored tip portion 15a, which is disposed between the objective lens 7 and the transparent plate 14 and is adapted to move, as the focusing ring 5 (not depicted in FIG. 9) is rotated, so as to point at one of the indexes 4a to 4d.

In the following, operations of the fourth embodiment will be explained.

Figure 10:
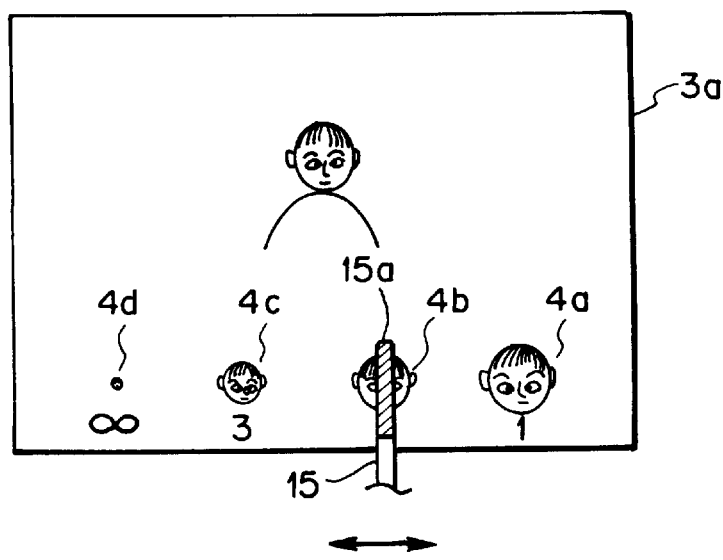
FIG. 10 is a view showing a configuration of the finder with focusing indicator in accordance with a fourth embodiment of the present invention.

FIG. 10 shows an image observed through the finder 3 at the time when a human image is being photographed. As shown in FIG. 10, in the finder 3, the human image 3a being photographed is guided to the eyepiece 8, and the images of the indexes 4a to 4d are guided to the eyepiece 8 while parallax is corrected by the lens portion 9c. Accordingly, in the finder 3, the human image 3a being photographed, the indexes 4a to 4d, and the pointer 15 can be observed. Then, as the focusing ring 5 is rotated, the pointer 15 is moved so as to point at one of the indexes 4a to 4d that has a size closest to the size of the human image 3a observed through the finder 3. In the state where the index 4b having a size closest to the size of the human image 3a is pointed at by the pointer 15, the focusing operation is completed.

In the following, a fifth embodiment of the present invention will be explained.

Figure 11:
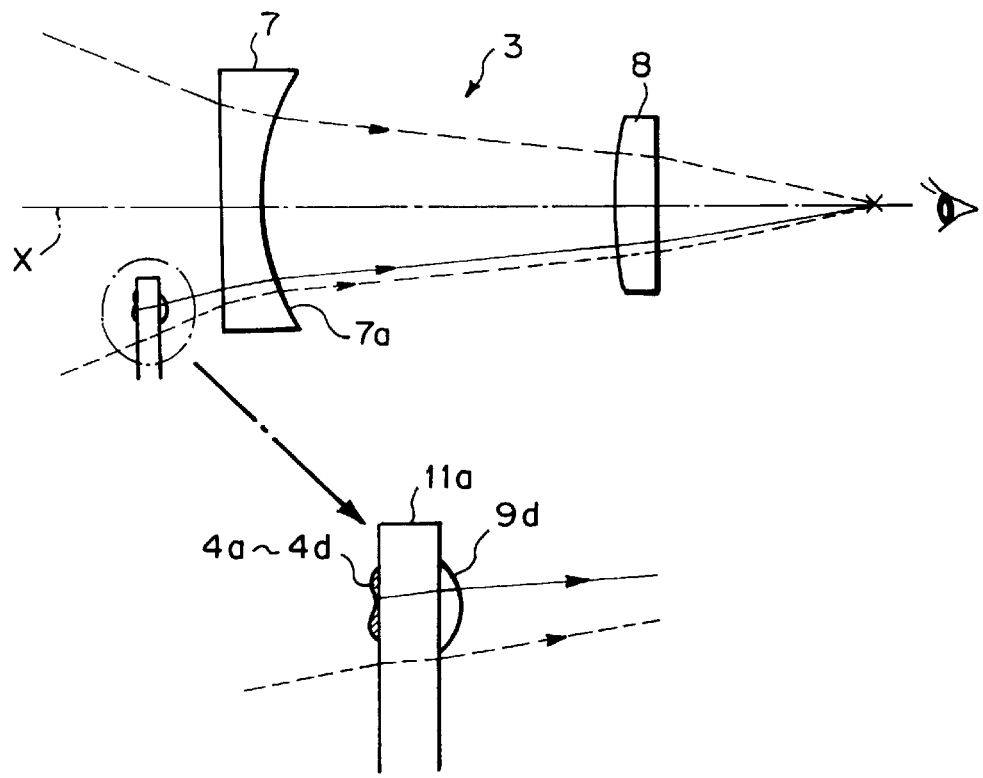
FIG. 11 is a sectional view showing a configuration of a finder with focusing indicator in accordance with a fifth embodiment of the present invention.

FIG. 11 is a view showing a configuration of the finder with focusing indicator in accordance with the fifth embodiment of the present invention. As shown in FIG. 11, in the finder 3 with focusing indicator in accordance with the fifth embodiment of the present invention, a transparent index plate 11a is used in place of the index plate 11 in the third embodiment, and the indexes 4a to 4d are printed on the object side of the transparent index plate 11a, while a lens portion 9d for correcting parallax is disposed on the objective lens 7 side thereof at a position corresponding to the indexes 4a to 4d. Also, a lower part 12c of the finder 3 is provided with a mask (cutout mask) 12b for displaying therethrough only one of the indexes 4a to 4d.

In the following, operations of the fifth embodiment will be explained.

Figure 12:
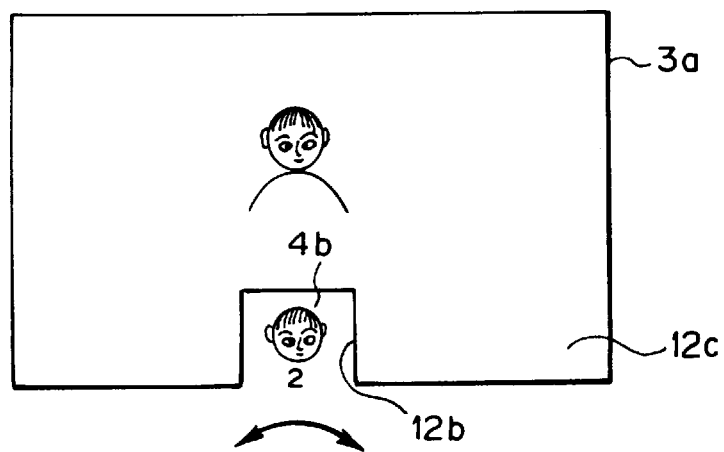
FIG. 12 is a view showing a configuration of the finder with focusing indicator in accordance with a fifth embodiment of the present invention.

FIG. 12 shows an image observed through the finder 3 at the time when a human image is being photographed. As shown in FIG. 12, in the finder 3, the human image 3a being photographed is guided to the eyepiece 8, and the images of the indexes 4a to 4d are guided to the eyepiece 8 while parallax is corrected by the lens portion 9d. Accordingly, while the human image 3a being photographed can be observed through the finder 3, the indexes 4a to 4d can be observed through the mask 12b. Then, as the focusing ring 5 is rotated, one of the indexes 4a to 4d (index 4b in FIG. 12) that has a size closest to the size of the human image 3a observed through the finder 3 is displayed through the mask 12b. At the time when the index 4b having a size closest to the size of the human image 3a is displayed through the mask 12b, the taking lens has moved to a position focused on the person. In this state, the focusing operation is completed.

In the following, a sixth embodiment of the present invention will be explained.

Figure 13:
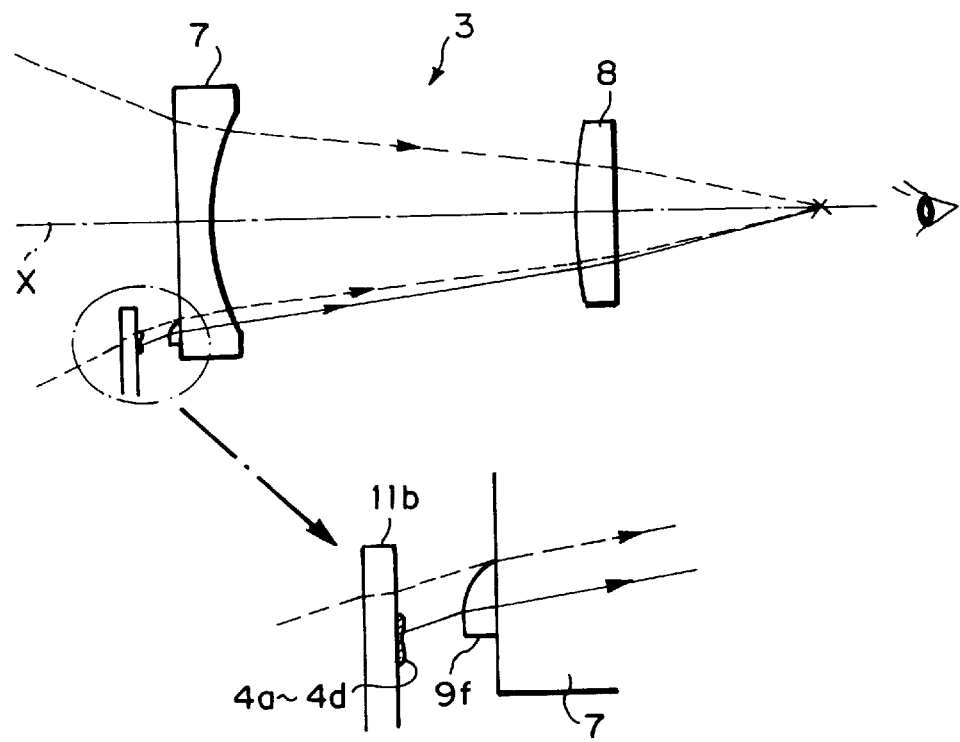
FIG. 13 is a sectional view showing a configuration of a finder with focusing indicator accordance with a sixth embodiment of the present invention.

FIG. 13 is a view showing a configuration of the finder with focusing indicator in accordance with the sixth embodiment of the present invention. As shown in FIG. 13, the finder 3 with focusing indicator in accordance with the sixth embodiment comprises, as with the third embodiment, an index plate 11b inscribed with the indexes 4a to 4d; a display window 12a, disposed at the lower end of the finder 3, for displaying the indexes 4a to 4d; and a lens portion 9f, disposed on the objective lens 7 at a position corresponding to the display window 12a, for correcting parallax.

In the following, operations of the sixth embodiment will be explained.

Figure 14:
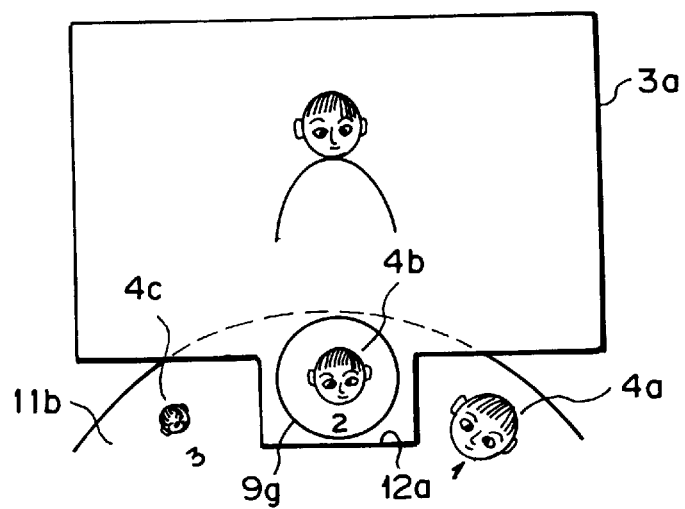
FIG. 14 is a view showing a configuration of the finder with focusing indicator in accordance with a sixth embodiment of the present invention.

FIG. 14 shows an image observed through the finder 3 at the time when a human image is being photographed. As shown in FIG. 14, in the finder 3, the human image 3a being photographed is guided to the eyepiece 8, and the images of the indexes 4a to 4d are guided to the eyepiece 8 while parallax is corrected by the lens portion 9f. Accordingly, while the human image 3a being photographed can be observed through the finder 3, the indexes 4a to 4d can be observed through a focusing portion 9g of the display window 12a. Then, as the focusing ring 5 is rotated, one of the indexes 4a to 4d (index 4b in FIG. 14) that has a size closest to the size of the human image 3a observed through the finder 3 is displayed at the display window 12a. At the time when the one of the indexes 4a to 4d having a size closest to the size of the human image 3a is displayed at the display window 12a, the taking lens has moved to a position focused on the person. In this state, the focusing operation is completed.

Thus, in the fourth to sixth embodiments, since focusing is effected as the pointer 15 points at one of the indexes 4a to 4d that has a size closest to the size of the human image 3a observed through the finder 3 or as such index is selected in the finder 3, a focusing operation can be performed by a simple configuration, thus allowing the camera to be constructed at a low cost.

While the focusing operation by the focusing ring 5 and displaying the indexes 4a to 4d are interlocked with each other in the fourth to sixth embodiments, the movement of the pointer 15 or the rotation of the index plates 11a and 11b may be performed independently of the focusing ring 5, so as to select one of the indexes 4a to 4d that has a size closest to the size of the human image 3a observed through the finder 3, so that only the focusing information based on such one of the indexes 4a to 4d can be obtained. When focusing information is thus obtained, the focusing ring 5 can be rotated on the basis of this focusing information so as to perform a focusing operation with respect to the human image 3a to be photographed.

Here, for example, in FIG. 2, in order to indicate that the object is located at a very close position where focusing is unavailable, an index 4e and a mark (such as "X" marking the whole index as shown in FIG. 2) indicating that photographing is impossible when the human image has such a size may be displayed next to and on the right side of the index 4a that corresponds to the object distance of 1 m.

In the finder with focusing indicator in accordance with the present invention, for example, two focus setting positions may be provided, and one index having a size substantially the same as the size of the object at an object distance corresponding to a focus setting position therebetween may be provided, so that the size of the object image is compared with the size of the index displayed on the finder. According to the result of the comparison, an operation for selecting one of the focus setting position may be performed, and focusing onto the object image may be performed according to this operation. Here, when the number of the focus setting positions is n, the number of the indexes is set to (n-1), so that a similar operation is performed.

As explained in detail in the foregoing, in the finder with focusing indicator in accordance with the present invention, indexes are successively displayed on the finder in synchronization with the focusing operation of the focus lens, and the size of the human image being observed through the finder and the size of the index are compared with each other, or the index having a size close to the size of the human image being observed through the finder is selected, so as to effect focusing. Accordingly, the configuration for displaying the index onto the finder can be simplified, whereby the camera can be constructed at a low cost.

Also, as the indexes are attached to the focusing ring, and the objective lens of the finder is provided with a deflecting prism or dioptric-correction lens for guiding the images of these indexes to the eyepiece, the configuration for displaying the indexes onto the finder can further be simplified.

In a photographic camera, in general, in order to minimize parallax between its photographing lens and finder, the finder is often disposed directly above the taking lens. Accordingly, the finder is usually disposed at a position where the lens barrel of the taking lens can easily be looked into. Thus, the present invention is provided in view of the circumstances in which the finder is incorporated in photographic cameras, thus attaining a higher adaptability to actual photographic cameras.

Also, as the deflecting prism or dioptric-correction lens is integrally molded with the objective lens of the finder, the display means can be configured further simply, whereby the camera can be constructed at a lower cost.

What is claimed is:

1. A finder with focusing indicator comprising:

a finder;

at least one index having a size corresponding to a size of a predetermined object image observed through said finder according to a position where said object is disposed; and display means for successively displaying said at least one index in synchronization with a focusing operation of a focus lens;

wherein focusing onto said object image is effected according to an operation performed in response to a result of comparison between the size of said at least one index displayed on said finder by said display means and the size of said object image; and wherein said at least one index is attached to a focusing ring which moves along an optical axis.

2. A finder according to claim 1, wherein said display means includes a part of an objective lens of said finder.

3. A finder according to claim 1, wherein said display means includes a deflecting prism, disposed near an objective lens of said finder, for guiding an image of said at least one index to an eyepiece of said finder.

4. A finder according to claim 3, wherein said deflecting prism is integrally molded with said objective lens.

5. A finder according to claim 1, wherein said display means includes a dioptric-correction lens, disposed near an objective lens of said finder, for guiding an image of said at least one index to an eyepiece of said finder.

6. A finder according to claim 5, wherein said dioptric-correction lens is integrally molded with said objective lens.

7. A finder with focusing indicator comprising:

a finder;

at least two indexes each having a size corresponding to a size of a predetermined object image observed through said finder according to a position where said object is disposed; and display means for successively displaying at least two indexes in synchronization with a focusing operation of a focus lens;

wherein focusing onto said object image is effected according to an operation for selecting, of said at least two indexes displayed on said finder by said display means, one that has a size closest to the size of said object image; and wherein said at least two indexes are attached to the focusing ring which moves along an optical axis.

8. A finder according to claim 7, wherein said display means includes a part of an objective lens of said finder.

9. A finder according to claim 7, wherein said display means includes a deflecting prism, disposed near an objective lens of said finder, for guiding images of said at least two indexes to an eyepiece of said finder.

10. A finder according to claim 9, wherein said deflecting prism is integrally molded with said objective lens.

11. A finder according to claim 7, wherein said display means includes a dioptric-correction lens, disposed near an objective lens of said finder, for guiding images of said at least two indexes to an eyepiece of said finder.

12. A finder according to claim 11, wherein said dioptric-correction lens is integrally molded with said objective lens.

13. A finder with focusing indicator comprising:

a finder;

at least one index having a size corresponding to a size of a predetermined object image observed through said finder according to a position where said object is disposed;

display means for successively displaying said at least one index;

a pointer;

wherein focusing onto said object image is effected according to an operation performed in response to a result of comparison between the size of said at least one index displayed on said finder by said display means and the size of said object image; and wherein the pointer moves in synchronism with a focusing operation and focusing is obtained when the at least one index is aligned with the pointer when the at least one index is the same size as an object.

14. A finder according to claim 13, wherein said pointer is attached to a focusing ring which moves said focus lens along an optical axis, and wherein said display means includes a part of an objective lens of said finder.

15. A finder according to claim 13, wherein said display means includes a dioptric-correction lens, disposed near an objective lens of said finder, for guiding an image of said at least one index to an eyepiece of said finder.

16. A finder according to claim 15, wherein said dioptric-correction lens is integrally molded with a transparent plate.

17. A finder with focusing indicator comprising:

a finder;

at least two indexes each having a size corresponding to a size of a predetermined object image observed through said finder according to a position where said object is disposed;

display means for successively displaying said at least two indexes;

a pointer;

wherein focusing onto said object image is effected according to an operation for selection of said at least two indexes displayed on said finder by said display means, one that has a size closest to the size of said object image; and wherein the pointer moves in synchronism with a focusing operation and focusing is obtained when the at least one index is aligned with the pointer when the at least one index is the same size as an object.

18. A finder according to claim 17, wherein said display means includes a part of an objective lens of said finder.

19. A finder according to claim 17, wherein said display means includes a dioptric-correction lens, disposed near an objective lens of said finder, for guiding images of said at least two indexes to an eyepiece of said finder.

20. A finder according to claim 19, wherein said dioptric-correction lens is integrally molded with a transparent plate.

21. A finder with focusing indicator comprising:

a finder;

an index plate;

at least one index on the index plate having a size corresponding to a size of a predetermined object image observed through said finder according to a positions where said object is disposed; and display means for successively displaying said at least one index in synchronization with a focusing operation of a focus lens;

a mask for displaying one index;

wherein focusing onto said object image is effected according to an operation performed in response to a result of comparison between the size of said at least one index displayed through the mask by said display means and the size of said object image;

wherein said index plate is attached to a focusing ring which moves said focus lens along an optical axis, and wherein said display means includes a part of an objective lens of said finder.

22. A finder with focusing indicator comprising:

a finder;

an index plate;

at least one index on the index plate having a size corresponding to a size of a predetermined object image observed through said finder according to a positions where said object is disposed; and display means for successively displaying said at least one index in synchronization with a focusing operation of a focus lens;

a mask for displaying one index;

wherein focusing onto said object image is effected according to an operation performed in response to a result of comparison between the size of said at least one index displayed through the mask by said display means and the size of said object image;

wherein said index plate is attached to a focusing ring which moves said focus lens along an optical axis, and wherein said display means includes a dioptric-correction lens, disposed near an objective lens of said finder, for guiding an image of said at least one index to an eyepiece of said finder.

23. A finder according to claim 22, wherein said dioptric-correction lens is integrally molded with said index plate.

24. A finder with focusing indicator comprising;

a finder;

an index plate;

at least two indexes on the index plate each having a size corresponding to a size of a predetermined object image observed through said finder according to a position where said object is disposed;

display means for successively displaying at least two indexes in synchronization with a focusing operation of a focus lens;

a mask for displaying one index;

wherein focusing onto said object image is effected according to an operation for selecting, of said at least two indexes displayed on said finder by said display means, one that has a size closest to the size of said object image;

wherein said index plate is attached to a focusing ring which moves said focus lens along an optical axis, and wherein said display means includes a part of an objective lens of said finder.

25. A finder with focusing indicator comprising;

a finder;

an index plate;

at least two indexes on the index plate each having a size corresponding to a size of a predetermined object image observed through said finder according to a position where said object is disposed;

display means for successively displaying at least two indexes in synchronization with a focusing operation of a focus lens;

a mask for displaying one index;

wherein focusing onto said object image is effected according to an operation for selecting, of said at least two indexes displayed on said finder by said display means, one that has a size closest to the size of said object image;

wherein said index plate is attached to a focusing ring which moves said focus lens along an optical axis and wherein said display means includes a dioptric-correction lens, disposed near an objective lens of said finder, for guiding images of at least two indexes of an eyepiece of said finder.

26. A finder according to claim 25, wherein said dioptric-correction lens is integrally molded with said index plate.

* * * * *